May 28, 1968  A. T. GREEN  3,385,097
DEFLECTION TRANSMISSION LINK
Filed Oct. 20, 1965
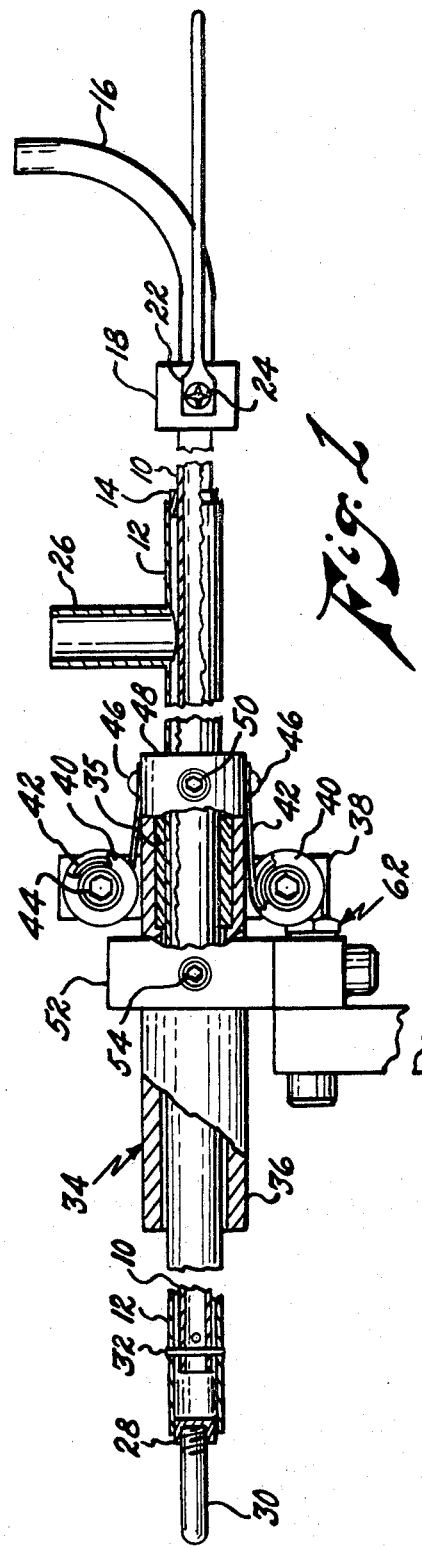
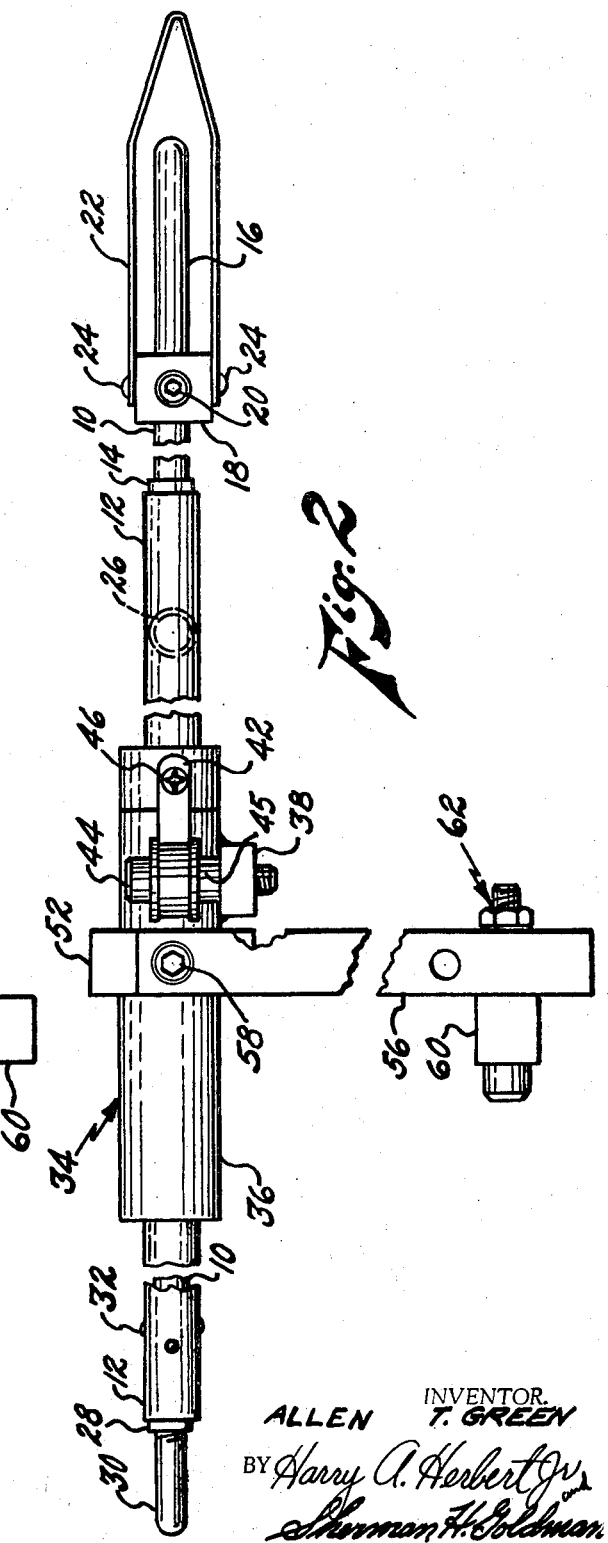
INVENTOR.
ALLEN T. GREEN
BY Harry A. Herbert Jr.
Sherman H. Goldman
ATTORNEYS United States Patent Office 3,385,097
Patented May 28, 1968

3,385,097
DEFLECTION TRANSMISSION LINK
Allen T. Green, Sacramento, Calif., assignor to the United States of America as represented by the Secretary of the Air Force
Filed Oct. 20, 1965, Ser. No. 499,121
2 Claims. (Cl. 73—16)

ABSTRACT OF THE DISCLOSURE

An apparatus for transmitting the deflection of a test specimen located in a high temperature environment to a measuring instrument comprising; two concentric tubes for circulating a cooling fluid through the apparatus, mounting means, a probe to contact the test specimen and bias means to contact said probe with the test specimen.

---

This invention relates generally to a transmission linkage, and more particularly, to an arrangment for measuring deflection of a test specimen in thermal environments in excess of 3500° F.

Accurate measurement of motions of test specimens at elevated temperatures above 3500° F. cannot presently be accomplished; accordingly, a need was perceived for a transmission linkage capable of measurement of motions of four inches with .5% accuracy.

The problem was solved by utilization of a probe attached to a water cooled linkage transmission element with supporting and biasing means mounted around the element at a distance from the high temperature environment.

The particular arrangement of this invention provides the advantage of eliminating excessive growths of the transmission linkage caused by high temperature expansion of the linkage.

Accordingly, it is an object of this invention to provide a device which will allow motions of a test specimen at elevated temperatures to be accurately measured and recorded.

It is another object of this invention to provide a deflection transmission linkage arrangement which, although being water cooled, does not produce cold spots on a test specimen at elevated temperatures.

It is another object of this invention to provide a deflection transmission link arrangement which is capable of being connected to conventional, currently available measuring devices which operate at room temperatures.

Still another object of this invention involves the provision of a deflection transmission linkage which is both easy and economical to manufacture of conventional, currently available materials which lend themselves to standard mass production manufacturing techniques.

These and other advantages, features and objects of the invention will become more apparent from the following description taken in connection with the illustrative embodiments in the accompanying drawings, wherein:

FIGURE 1 is a view partly in section of the deflection transmission linkage of this invention; and FIGURE 2 is also a view of the deflection transmission link of FIGURE 1 which has been rotated 90°.

The invention comprises a pair of concentric annular tubes which are arranged to allow a continuous flow of water to provide a cooling action. The inner tube 10 is spaced from the outer tube 12 at one end of tube 12 by means of a bushing 14 to which both tubes are welded. The end of the inner tube 10 remote from the probe end of the device is bent, as at 16, to provide an outlet for the coolant, and a collar 18 is fitted at the straight portion of the tube 10 adjacent the curved portion 16 to be held thereon by means of set screws 20. The collar provides a support for a fitting 22 which is rotatable about an axis through machine screws 24 which provide the means for securing the fitting to the collar. An outlet 26 is provided in the outer tube 12 to complete the coolant path. Of course, 26 could be made to be the inlet and 16 the outlet without departing from the scope of this invention.

The outer tube 12 has at the probe end thereof a bushing 28 welded thereto which forms a closure for the tube 12. The bushing 28 has a threaded bore which receives a probe tip 30 which is made of insulating material to avoid a cold spot being produced at specimen contact. Proper placement of the tubes 10 and 12 relative to each other is aided by means of pins 32 which extend through the walls of both tubes and are welded to tube 12 and ground flush.

The unit of this invention, thus far described, is required to be supported through a holder and bushing assembly which is mounted outside the heated area. In addition, the tubes are required to be spring loaded against the specimen in order to follow its motion.

Mounting of the tubes is achieved by means of a guide assembly 34. Surrounding the tube 12 is a cylinder 36 of the guide assembly 34 which has therein an enlarged bore which contains a Teflon bushing 35 in engagement with the outer tube 12. Attached to the cylinder 36 is a plate 38 which is secured thereto by welding. A pair of spools 40 are attached to the plate 38 by means of a socket head shoulder screw 44 which allows for rotation of the spool with separation of the spool from the plate 38 being provided by a spacer 45. A pair of Negator springs 42 each have one end secured to a spool 40 while the other end is secured at 46 to a collar 48 which in turn is fixed to the outer tube 12 by means of a set screw 50.

A mounting bracket 52 is provided for securing the guide assembly 34 at a position outside of the high temperature thermal environment. A set screw 54 is utilized to extend through the mounting bracket 52 and engage with the cylinder 36, while a bar 56 is arranged to be secured at 58 by means of a bolt to the mounting bracket 52. An additional bar 60 is secured by means of a cap screw, nut and lock washer arrangement 62 to the first bar 56. Each of the bars 56 and 60 have a series of holes therein for enabling the mounting of the deflection transmission link to high temperature equipment at the exterior thereof. The particular mounting bracket and linkage arrangement may be of any form which would allow for adjustment of the guide assembly at the exterior of the housing containing the high temperature specimen.

The deflection transmission cable thus far described is capable of use in thermal environment in excess of 3500° F., thereby enabling the solution of structural test work problems at these temperatures. The arrangement of the guide assembly and water cooled probe allows motions of a test specimen at elevated temperatures to be accurately measured and recorded.

In order to provide for operation at elevated temperatures, it is contemplated that the probe be made of polycrystalline alumina while the tube with its associated bushings and pins which enter the high temperature environment would be manufactured of Invar. Nylon may be utilized for the spacer material while Teflon could be the material in bushing 35. The remaining portions of the device may utilize a corrosion resistant steel.

Although a Negator spring of the type manufactured by Hunter Spring of Hatfield, Pa., has been specified because it applies a constant force over any given extension, other springs may be utilized to produce variations of the force. In addition the shape of the probe 30 may be varied to allow for shapes such as hooks, ball tips, pointed tips and flat contact tips to accommodate any specimen shape. The fitting 22 with its associated collar may be connected to any of the commercially available devices for measuring motions at room temperatures, for example, linear potentiometers, dial gauges, etc. Specimen motions are then read and recorded during elevated temperature testing.

The deflection transmission link, when the probe is biased against a high temperature specimen by adjusting the physical relationship between the mounting brackets 52 in order that the Negator springs exert their force, is capable of extremely good accuracy because of its being water cooled. The link has had growths of less than .5% of a four inch measured specimen travel when subjected to use above 3500° F., thereby enabling a high degree of accuracy with its measurement process.

Although the invention has been described with reference to a particular embodiment, it will be understood to those skilled in the art that the invention is capable of a variety of alternative embodiments within the spirit and scope of the appended claims.

I claim:
1. A deflection transmission link arrangement for detecting movement of a test specimen in a high temperature environment comprising
    a pair of concentric tubes,
    a probe for detecting movement of a test specimen at one end of the outer of said concentric tubes forming a closure therefor,
    means for sealing the other end of said outer tube to the inner tube of said concentric tubes in a fluid-tight relationship,
    means forming a passageway connected with said outer tube proximate to said other end,
    means for maintaining the spatial orientation of said tubes such that fluid flow can exist between said passageway, along the space between said inner and outer tubes and said inner tube, and
    means to be located external to a high temperature environment and mounted with respect to said tubes for biasing said tubes in an axial direction toward said end with said probe.

2. A deflection transmission link arrangement for detecting movement of a test specimen as defined in claim 1 wherein said last-mentioned means comprises
    fixed mounting means for said link arrangement, said mounting means allowing for passage of said tubes therethrough, and
    spring means secured to said tubes and to said mounting means to cause said tubes to be biased through said fixed mounting means.

References Cited
UNITED STATES PATENTS

| | | | |
|---|---|---|---|
| 2,279,368 | 4/1942 | Dietert | 73—51 |
| 3,167,956 | 2/1965 | Grey | 73—190 |

JAMES J. GILL, *Primary Examiner.*

E. E. SCOTT, *Assistant Examiner.*